(12) United States Patent
Nemiroff et al.

(10) Patent No.: US 9,721,104 B2
(45) Date of Patent: Aug. 1, 2017

(54) CPU-BASED MEASURED BOOT

(71) Applicant: INTEL CORPORATION, Santa Clara, CA (US)

(72) Inventors: Daniel Nemiroff, Folsom, CA (US); Ben Furman, Kfar-Saba (IL)

(73) Assignee: Intel Corporation, Santa Clara, CA (US)

(*) Notice: Subject to any disclaimer, the term of this patent is extended or adjusted under 35 U.S.C. 154(b) by 461 days.

(21) Appl. No.: 14/091,026

(22) Filed: Nov. 26, 2013

(65) Prior Publication Data

US 2015/0149751 A1    May 28, 2015

(51) Int. Cl.
*G06F 21/57* (2013.01)

(52) U.S. Cl.
CPC .................. *G06F 21/575* (2013.01)

(58) Field of Classification Search
CPC .................................................... G06F 21/575
See application file for complete search history.

(56) References Cited

U.S. PATENT DOCUMENTS

| | | | | |
|---|---|---|---|---|
| 6,678,833 B1* | 1/2004 | Grawrock | ............. | G06F 9/4401 713/1 |
| 2002/0191792 A1* | 12/2002 | Anand | ................. | H04L 9/0643 380/255 |
| 2005/0050283 A1* | 3/2005 | Miller | ..................... | G06F 9/526 711/150 |
| 2005/0132177 A1* | 6/2005 | Challener | ............. | G06F 21/575 713/1 |
| 2005/0193217 A1* | 9/2005 | Case | ....................... | G06F 21/57 726/22 |
| 2005/0251857 A1* | 11/2005 | Schunter | ................. | G06F 21/57 726/16 |
| 2005/0262571 A1* | 11/2005 | Zimmer | .................. | G06F 21/57 726/27 |
| 2005/0283601 A1* | 12/2005 | Tahan | ................... | G06F 21/575 713/2 |
| 2006/0026423 A1* | 2/2006 | Bangerter | ............. | H04L 9/3218 713/164 |
| 2008/0005574 A1* | 1/2008 | Cheng | ..................... | G06F 21/57 713/181 |
| 2008/0130893 A1* | 6/2008 | Ibrahim | ................ | G06F 21/572 380/277 |
| 2008/0250252 A1* | 10/2008 | Tasher | ................ | G06F 12/1416 713/189 |
| 2009/0132829 A1* | 5/2009 | Ohhashi | .................. | G06F 21/51 713/187 |

(Continued)

*Primary Examiner* — Jaweed A Abbaszadeh
*Assistant Examiner* — Cheri Harrington
(74) *Attorney, Agent, or Firm* — International IP Law Group, P.L.L.C.

(57) ABSTRACT

A measured boot process for an electronic device includes taking a measurement of the early system start up instructions of the electronic device upon a reboot or start-up of the device. A representation of the measurement is stored in a trusted platform module of the electronic device prior to initialization of the trusted platform module. Access is granted to the representation of the measurement stored in the trusted platform module prior to initialization of the trusted platform module thereby enabling the representation of the measurement to serve as the core root of trust for measurement.

18 Claims, 9 Drawing Sheets

(56) References Cited

U.S. PATENT DOCUMENTS

| | | | | |
|---|---|---|---|---|
| 2010/0169599 A1* | 7/2010 | Natu | ................ | G06F 21/71 |
| | | | | 711/163 |
| 2010/0281273 A1* | 11/2010 | Lee | ................ | G06F 21/72 |
| | | | | 713/190 |
| 2012/0124356 A1* | 5/2012 | Datta | ................ | G06F 21/575 |
| | | | | 713/2 |
| 2013/0198838 A1* | 8/2013 | Schmidt | ................ | H04L 9/3234 |
| | | | | 726/22 |
| 2013/0263205 A1* | 10/2013 | Jacobs | ................ | G06F 21/57 |
| | | | | 726/1 |
| 2014/0025939 A1* | 1/2014 | Smith | ................ | G06F 9/24 |
| | | | | 713/2 |
| 2014/0258700 A1* | 9/2014 | England | ................ | G06F 21/572 |
| | | | | 713/2 |
| 2015/0134942 A1* | 5/2015 | Novak | ................ | G06F 21/575 |
| | | | | 713/2 |

* cited by examiner

400

500

CPU-BASED MEASURED BOOT

TECHNICAL FIELD

The present techniques relate generally to security and authentication in computer systems. More particularly, the present techniques relate to a measured boot process in computer systems.

BACKGROUND ART

In computer security, a measured boot process is a process that scrutinizes the configuration of a client computer by taking secure measurements in the form of cryptographic hashes of the software residing on and the hardware of the client computer, and recording those measurements in a Trusted Platform Module (TPM) of the client computer. A measured boot may utilize a Core Root of Trust for Measurement (CRTM), which is typically the first piece of software or code executed on a platform at boot time. When executed, the CRTM takes and stores, or extends, the first measurement or hash of the client software in the TPM, and thus establishes the basis for subsequent measurements. The CRTM itself, however, may not be subject to scrutiny or measurement in a measured boot process, and is simply considered or assumed to be trustworthy. The CRTM may reside in the BIOS or BIOS boot block, and thus may be vulnerable to a root kit masquerading as system BIOS and to attacks from other malware.

Since software is fairly easy to modify relative to hardware, a software-based CRTM may not be as secure as a hardware-based CRTM, and thus a hardware-based CRTM would generally be preferable. However, since hardware must be initialized and TPM protocols are relatively complicated, implementation of a hardware-based CRTM involves certain tradeoffs, and, thus, may not be efficient or practical. More particularly, since the measurements or hashes taken of the system software during a measured boot process are stored in the TPM, the TPM may first be initialized and its firmware loaded, validated and initialized prior to it being able to accept and store any measurements. Since the CPU is the first piece of hardware to initialize upon system start or reset, it would be preferable to utilize the CPU or its microcode as the CRTM. However, the time to initialize the TPM precludes utilizing the client CPU or its microcode as the CRTM since the CPU, as the first piece of hardware to be initialized, may need to store its measurement prior to the TPM being initialized and able to receive and store the measurement.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
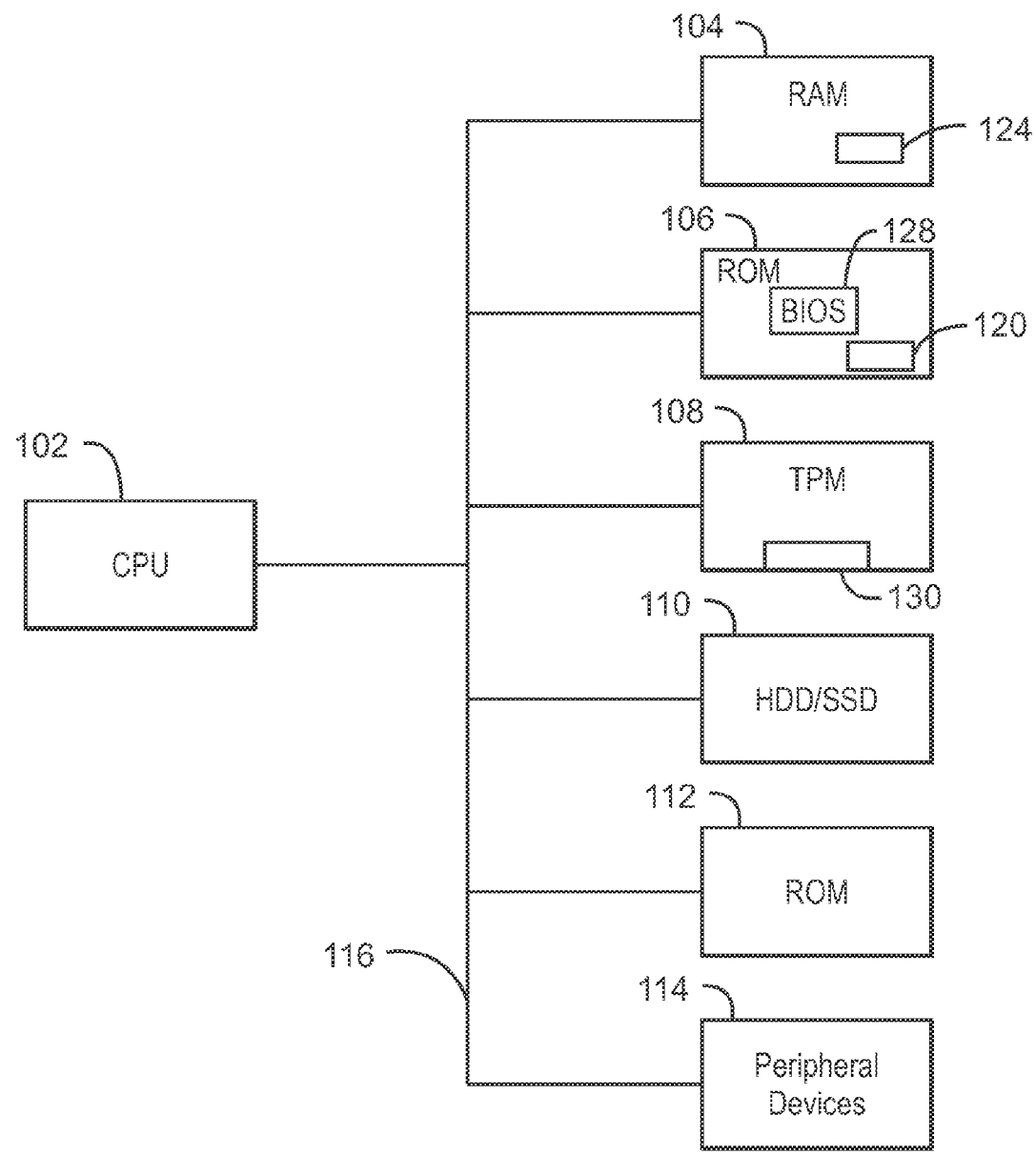
FIG. 1 is a block diagram of an electronic device, in accordance with embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an electronic device 100 having a measured boot process in accordance with embodiments. Electronic device 100 may be a client computer, server, laptop, tablet, or virtually any type of electronic device with a central processor. Electronic device 100 includes central processing unit (CPU) 102, random access memory (RAM) 104, read only memory (ROM) 106, trusted platform module (TPM) 108, non-volatile memory 110, and peripheral devices 114, all of which are communicatively coupled to and exchange signals/information via system bus 116.

CPU 102 may, in embodiments, be a conventional CPU capable of reading and executing various computer-readable instructions 120, which, in embodiments, may include microcode instructions, stored in ROM 106. CPU 102 may, in alternate embodiments, be configured as a microcontroller, programmable logic controller, or other hardware device. RAM 104 may store various computer-readable instructions 124 that are also executable by CPU 102. ROM 106 may be configured as nonvolatile read only memory, and may store the BIOS instructions 128 of electronic device 100. TPM 108 includes hardware control register 130, as will be more particularly described hereinafter. HDD/SDD 110 may be configured as a hard disk drive or a solid state drive memory, and may also store computer-readable instructions and data accessible by CPU 102. Peripheral devices 114 may include a printer, display, pointing device, and similar devices.

Figure 2:
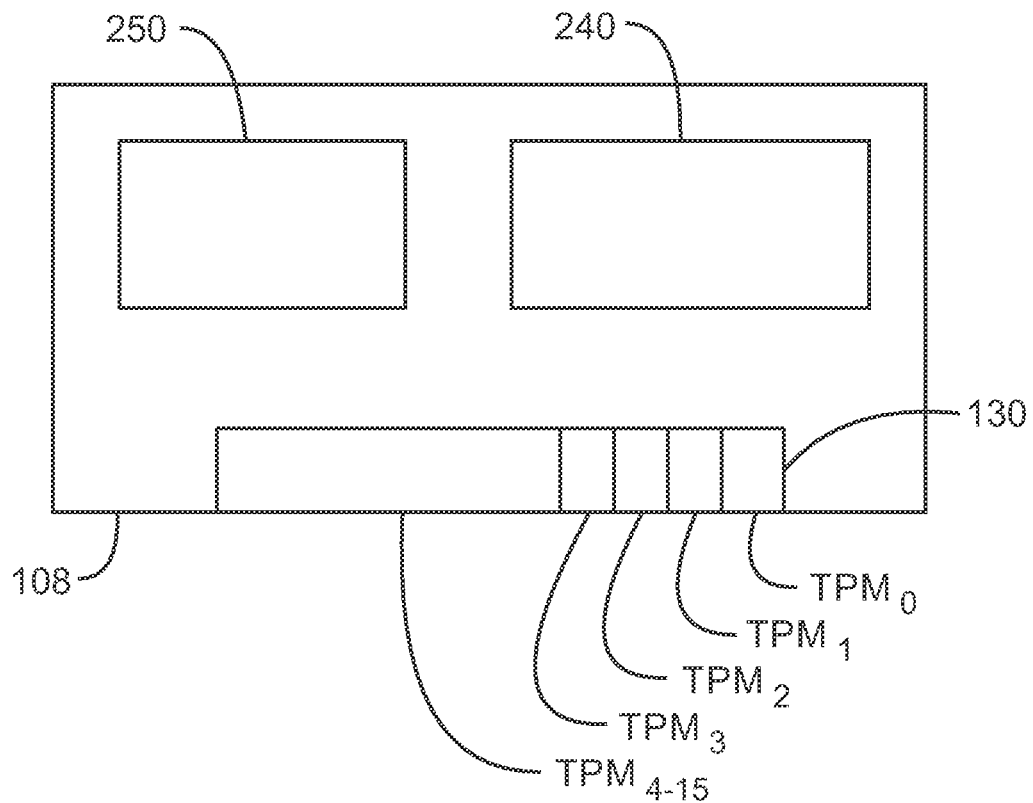
FIG. 2 is a block diagram of the trusted platform module of FIG. 1.

FIG. 2 is a block diagram of TPM 108. TPM 108 includes hardware control register 130 which may be configured, for example, as a 16 bit register. Control register 130 includes bits $TPM_{0-4}$, which may respectively also be referred to hereinafter as the hash start bit ($TPM_0$), hash data bit ($TPM_1$), hash end bit ($TPM_2$), and clear bit ($TPM_3$). TPM control register 130 may in embodiments be the TPM hardware locality control register, which may also be known to those of ordinary skill in the art as the TPM locality 4 control register.

The TPM 108 also includes a command buffer 240, which may, in embodiments, be configured as a static random access memory (SRAM) buffer, sufficient in size to store commands received from the CPU 102. Command buffer 240 is a buffer that can receive measurements from the CPU 102 before TPM 108 firmware is loaded and prior to initialization of TPM 108. Command buffer 240 may, in embodiments, be memory mapped to CPU 102, and thus only CPU 102 is enabled to write data to command buffer 240. TPM 108 further includes logic 250 to support a request/use access granted protocol, consistent with the trusted computing group protocol, and request-use control by the CPU 102. Logic 250 may, in embodiments, be configured as hardware-based logic. As will be more particularly described with reference to FIG. 4, logic 250 configures TPM 108 to automatically grant the CPU 102 write access to command buffer 240 thereby enabling TPM 108 to accept, decode, and store in command buffer 240 a measurement from CPU 102 prior to loading of the TPM 108 firmware and initialization of TPM 108.

Figure 3:
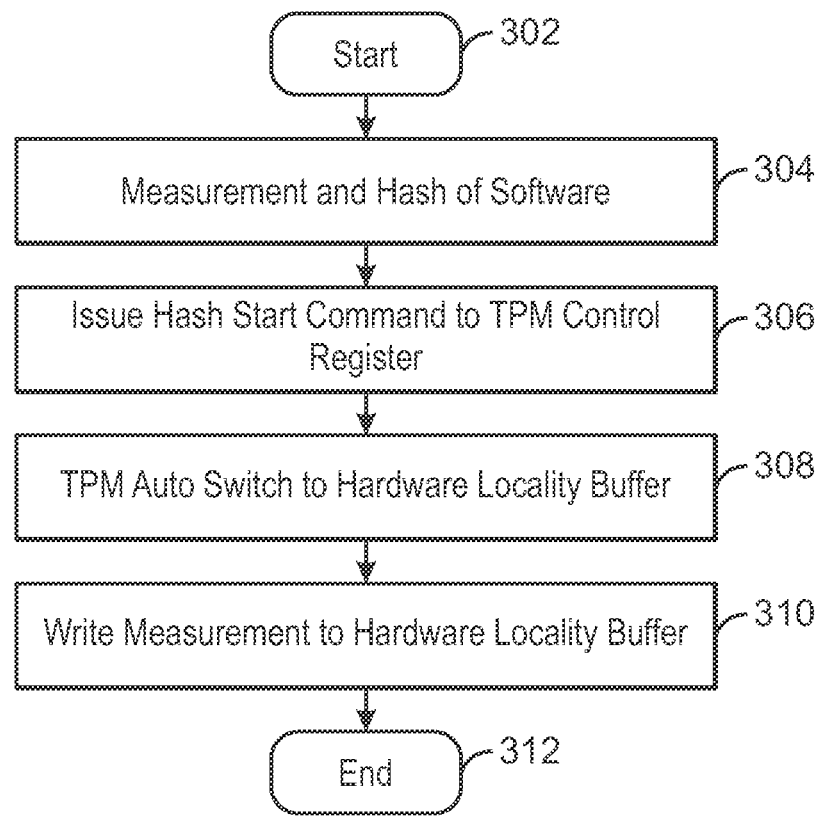
FIG. 3 is a process flow diagram of one embodiment of a measured boot process.

FIG. 3 is a process flow diagram for one embodiment of a CPU-based measured boot process. Measured boot process 300, in various embodiments, may be executed by, for example, CPU 102 of electronic device 100. In embodiments, the method 300 may be embodied at least in part as machine-readable and executable instructions, such as the microcode 120 of CPU 102. Measured boot process 300 includes start block 302, measurement and hash block 304, issue hash start command block 306, auto switch to hardware locality block 308, write measurement block 310, and end block 312.

At block 302, the measured boot process commences upon a boot up or reset of CPU 102 and/or electronic device 100, and CPU 102 is initialized. CPU 102 will initialize and become operational early in the reset or boot up process, whereas TPM 108, however, will not yet be initialized or have its firmware fully loaded, and thus will not be fully-operational, until later in the rest or boot up process.

At block 304, while TPM 108 remains uninitialized and not fully operational, CPU 102 takes a measurement of the first piece of software to be executed by electronic device 100, which may, in embodiments, be the BIOS 128 or the boot block of BIOS 128. In embodiments, the execution of the microcode 120 of CPU 102 causes CPU 102 to take the measurement. CPU 102 then performs a cryptographic hash of the measurement data, which may, in embodiments, be performed via a secure hashing algorithm (SHA) such as, for example, the SHA-1 or SHA-2 algorithms.

At block 306, while TPM 102 remains uninitialized and not fully operational, CPU 102 issues a HASH_START command to TPM 108 after TPM logic 250 confirms that the control register 130 of TPM 108 is not currently processing a request and is not already assigned to a different locality or software entity, as will be explained in more detail with reference to FIG. 4. More particularly, assuming TPM logic 250 confirms that the control register 130 of TPM 108 is not currently processing a request and is not already assigned to a different locality or software entity, CPU 102 executing microcode 120 issues the HASH_START command to TPM control register 130 to thereby set the hash start bit ($TPM_0$) of TPM control register 130. In embodiments, TPM control register 130 may be the TPM hardware locality control register, which may also be known to those of ordinary skill in the art as the TPM locality 4 control register.

Setting of the hash start bit ($TPM_0$) causes, at block 308, TPM logic 250 to confirm that only the hash start bit ($TPM_0$), and no other bit, of TPM control register 130 is set. If the hash start bit ($TPM_0$) is the only bit of TPM control register 130 that is set, ($TPM_0$), TPM logic 250 causes the active locality and location assigned bits of TMP 108 to be set within the same clock cycle, thereby ensuring the CPU can access and write the hashed measurement data to the TPM command buffer 240 during the next clock cycle.

As described above, the TPM command buffer 240 is a buffer that can receive measurements from the CPU 102 and is enabled to receive those measurements before TPM 108 firmware is loaded and prior to initialization of TPM 108. More particularly, when TPM logic 250 confirms that the control register 130 of TPM 108 is not currently processing a request and is not already assigned to a different locality or software entity, and confirms that only the hash start bit ($TPM_0$) of TPM control register 130 is set, the TPM logic 250 enables and configures TPM 108 to automatically grant the CPU 102 write access to TPM command buffer 240 thereby enabling TPM 108 to accept, decode, and store in command buffer 240 a measurement from CPU 102 prior to completion of the loading of the TPM 108 firmware and initialization of TPM 108. In embodiments, TPM logic 250 may be configured as a hardware multiplexor within the TPM 108. Command buffer 240 may, in embodiments, be memory mapped to CPU 102, and thus may permit only CPU 102 to write data to command buffer 240. Logic 250 and the details of block 308 are more particularly described with reference to FIG. 4.

At block 310, while TPM 102 remains uninitialized and not fully operational, the measurement taken by the CPU 102 is written to the TPM command buffer 240. More particularly, the CPU 102, in embodiments, provides to TPM 108 a data byte or bytes indicating the data length of the measurement data and the actual hashed measurement data to command buffer 240 of TPM 108. CPU 102 then sets the hash data ($TPM_1$) and hash end ($TPM_2$) bits of TPM control register 130. The clear bit ($TPM_3$) of TPM control register 130 is then set at end block 312.

Figure 4:
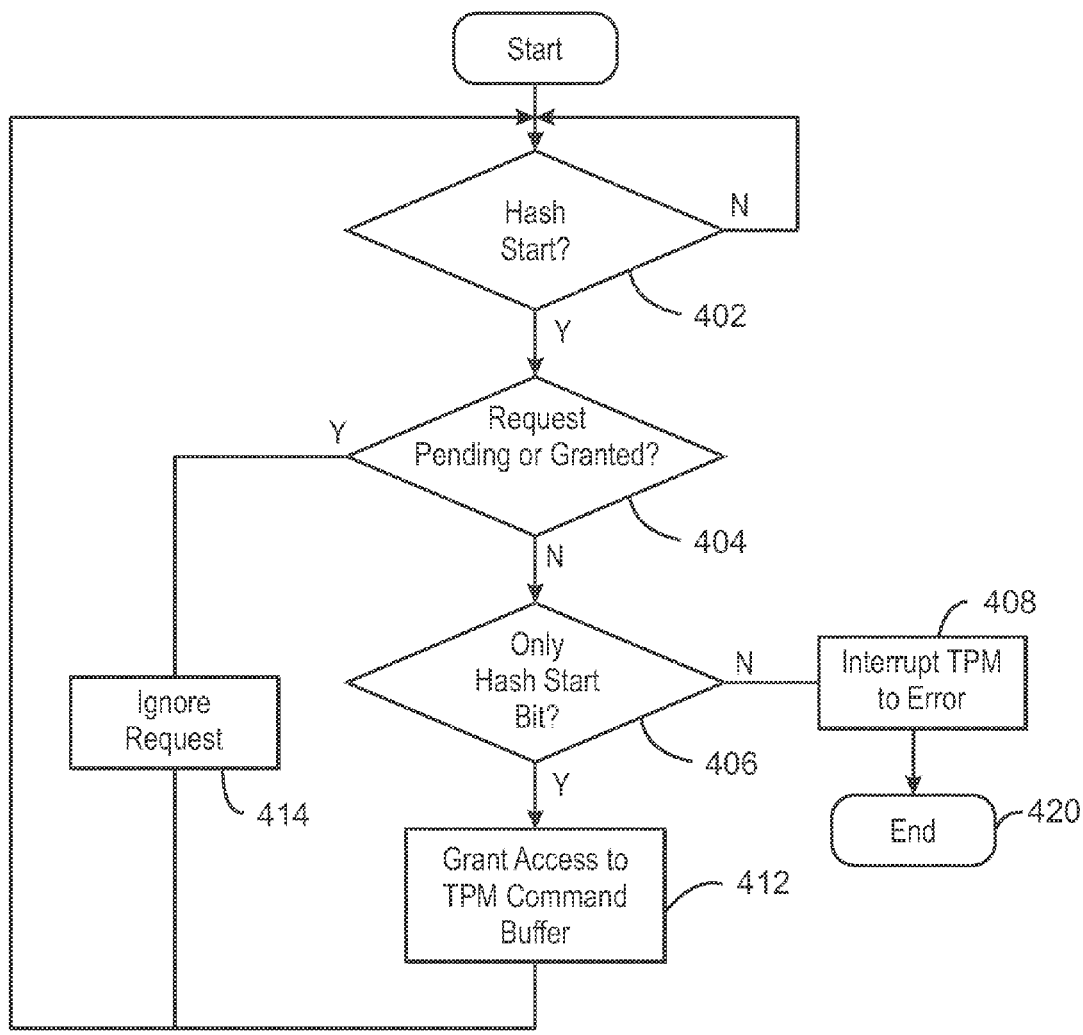
FIG. 4 is a process flow diagram of one embodiment of a process to automatically grant access to a trusted platform module command buffer prior to initialization of the trusted platform module.

FIG. 4 is a process flow diagram illustrating one embodiment of the process (shown generally at block 308 of FIG. 3) by which TPM logic 250 determines whether to automatically grant CPU 102 access to the TPM command buffer 240 prior to TPM firmware being loaded and the TPM 108 being initialized. TPM auto-grant process 308 includes hash start bit set check at block 402, TPM requested or assigned check 404, only hash start bit set check 406, error condition interrupt 408, grant access to TPM command buffer 412, and ignore CPU request 414. TPM auto-grant process 308, in various embodiments, may be embodied in TPM hardware.

Hash start bit check 402 monitors the hash start bit ($TPM_0$) of TPM control register 130 to determine whether the bit is set. If the hash start bit ($TPM_0$) is not set the auto-grant process continues to monitor the hash start bit ($TPM_0$) to detect if and when it becomes set. If the hash start bit ($TPM_0$) is set, TPM requested or assigned check 404 checks to determine whether another locality or software entity has requested access, or previously requested and has been granted current access, to the TPM 108. If another locality or software entity has requested or has current access to the TPM 108, the TPM auto-grant process 308 will at block 414 ignore the request for access from CPU 102, and return to monitoring the hash start bit at block 402. Alternatively, if no other locality or software entity has requested or has current access to the TPM 108, the TPM auto-grant process 308 at block 406 checks to determine whether only the hash start bit ($TPM_0$) of TPM control register 130 has been set. If the hash start bit ($TPM_0$) is not the only bit of TPM control register 130 that is set, an error condition may exist and the TPM auto-grant process 308 at block 408 interrupts TPM 108 and the TPM auto-grant process ends at block 420. If the hash start bit ($TPM_0$) is the only bit of TPM control register 130 that is set, the TPM auto-grant process 308 at block 412 grants the CPU 102 access to TPM command buffer 240. In embodiments, granting the CPU 102 access to the TPM command buffer 240 includes TPM logic 250 enabling and configuring the TPM 108 to accept, decode, and store in command buffer 240 a measurement from CPU 102 prior to completion of the loading of the TPM 108 firmware and initialization of TPM 108. In embodiments, TPM logic 250 may be configured as a hardware multiplexor within the TPM 108.

Figure 5:
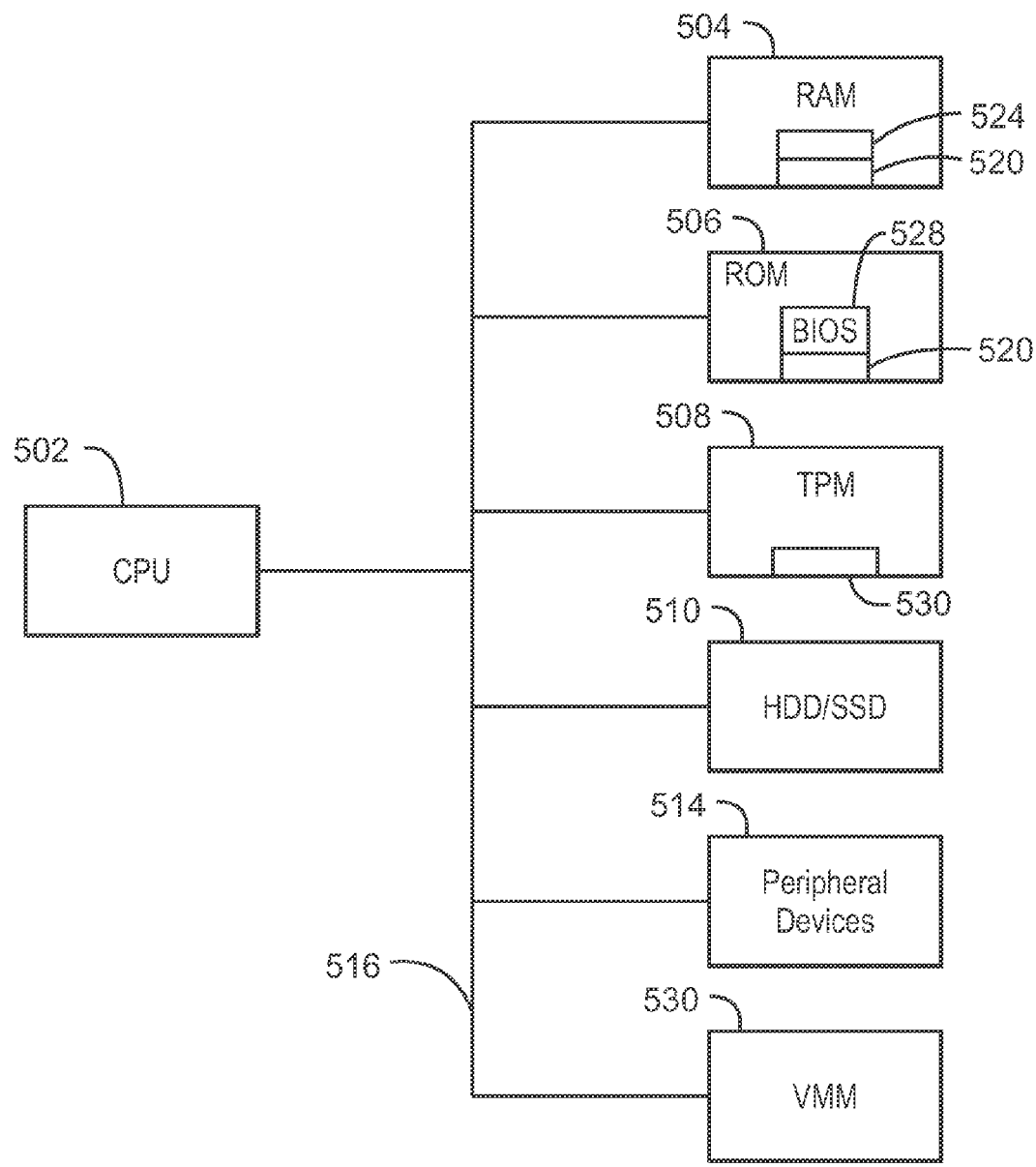
FIG. 5 is a block diagram of one embodiment of an electronic device.

FIG. 5 is a block diagram illustrating an electronic device having virtual TPM buffers. Electronic device 500 may be a client computer, server, laptop, tablet, or virtually any type of electronic device with a central processor. Electronic device 500 includes central processing unit (CPU) 502, random access memory (RAM) 504, read only memory (ROM) 506, trusted platform module (TPM) 508, non-volatile memory 510, and peripheral devices 514, all of which are communicatively coupled to and exchange signals/information via system bus 516.

CPU 502 may, in embodiments, be a conventional CPU capable of reading and executing various computer-readable instructions, including microcode instructions 520 stored in ROM 506. CPU 102 may, in alternate embodiments, be configured as a microcontroller, programmable logic controller, or other hardware device. RAM 504 may also store various computer-readable instructions 524 that are also executable by CPU 502. ROM 506 may be configured as nonvolatile read only memory, and may store the BIOS instructions 528 of electronic device 500. TPM 508 is described below with reference to FIG. 6. HDD/SDD 510 may be configured as a hard disk drive or a solid state drive memory, and may also store computer-readable instructions and data accessible by CPU 502. Peripheral devices 514 may include a printer, display, pointing device, and similar devices.

Electronic device 500 also includes a virtual machine manager (VMM) 530 communicatively coupled to bus 516. VMM 530 performs various system management tasks, including assigning memory, and may abstract memory resources from the underlying hardware of electronic device 500.

Figure 6:
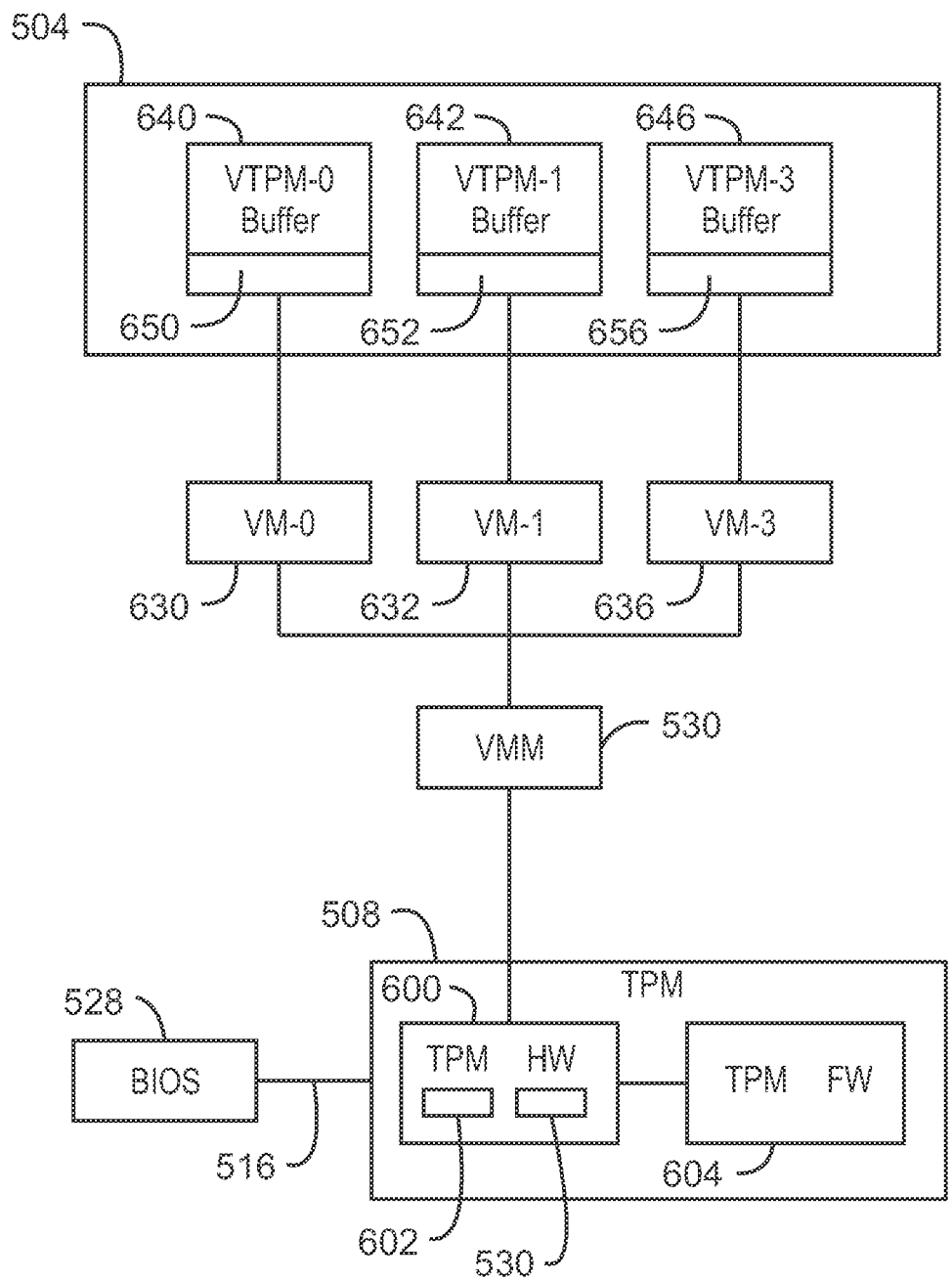
FIG. 6 is a block diagram showing additional detail of one embodiment of the electronic device of FIG. 5.

TPM 508, as best shown in FIG. 6, includes TPM hardware 600, including one or more TPM hardware control registers 530 and TPM direct memory access (DMA) engine 602, and TPM firmware 604, which includes machine-readable instructions executable by TPM 508. TPM hardware control registers 530 may be configured, for example, as 16 bit registers. Control registers 530 each include bits $TPM_{0-4}$ (as shown in FIG. 2) which may respectively also be referred to hereinafter as the hash start bit ($TPM_0$), hash data bit ($TPM_1$), hash end bit ($TPM_2$), and clear bit ($TPM_3$). TPM control register 530 may in embodiments include the TPM hardware locality control register, which may also be known to those of ordinary skill in the art as the TPM locality 4 control register.

TPM 508 is communicatively coupled via bus 516 to the VMM 530, which, in turn, is communicatively coupled via bus 516 to one or more Virtual Machines (VM), such as VM-0 630, VM-1 632, . . . , and VM-3 636. In embodiments, the number of VMs to which VMM 530 may be coupled may be greater or less than the number of VMs shown in FIG. 6. Each of VM-0 630 to VM-4 636 is communicatively coupled via bus 516 to RAM 504, which in embodiments may be configured as dynamic random access memory (DRAM). RAM 504 has defined therein a respective virtual TPM buffer (VTPM buffer) corresponding to each of the VMs, i.e., VM-0 630 to VM-4 636. In the embodiment shown, RAM 504 has defined therein VTPM command buffers VTPM-0 640, VTPM-1 642, . . . , and VTPM-3 646. The VPTM command buffers are accessible by TPM 108 via VMM 530 independent of CPU 502. In embodiments, the VPTM command buffers VTPM-0 640, VTPM-1 642, and VTPM-4 646 are configured as direct memory access (DMA) memory locations or address blocks allocated by VMM 530 within RAM 504. Thus, each VM 630-636 sees only its corresponding VTPM command buffer 640-646.

The VTPM command buffers may, in embodiments, each be comprised of a block of addresses four (4) KB in size. Further, each of the virtual TPM command buffers 640-646 may also include a respective memory location that is allocated or serves as a virtual TPM control register 650, 652, 656, and which VTPM control registers 650-656, in embodiments, may be allocated to the base address or another address within the block of memory addresses corresponding to the virtual TPM command buffer.

Figure 7:
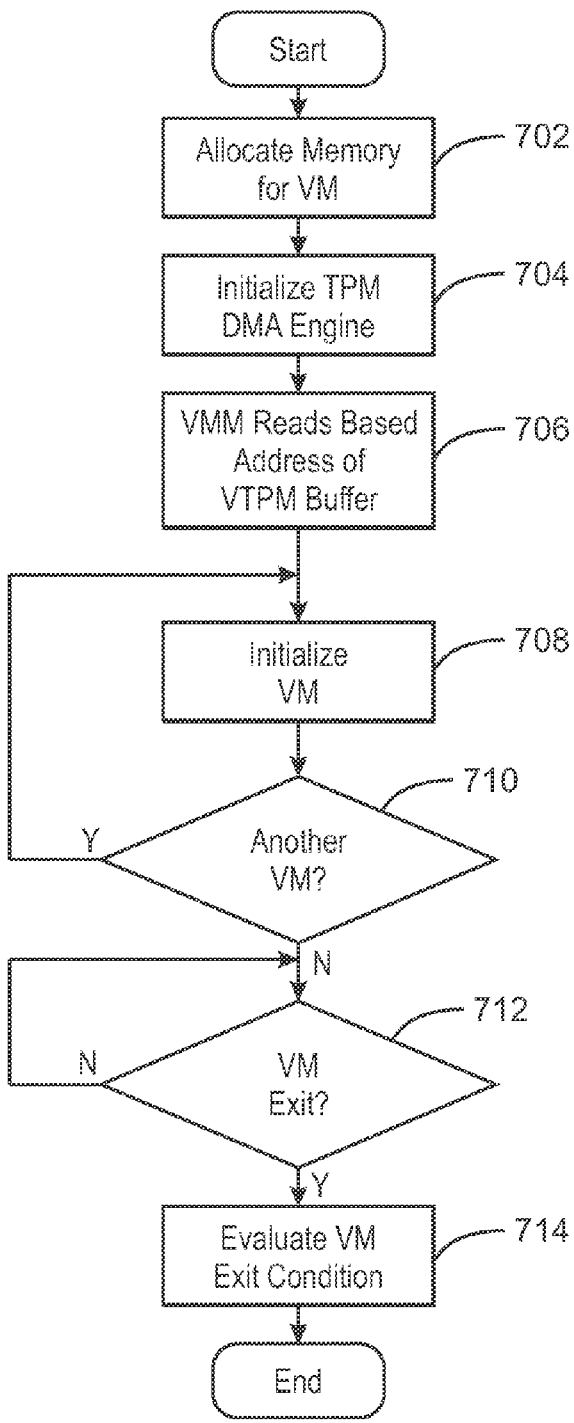
FIG. 7 is a process flow diagram of one embodiment of a method for initializing virtual TPM command buffers.

FIG. 7 is a process flow diagram illustrating a method for initializing virtual TPM command buffers, such as VTPM command buffers 640-646 of FIG. 6. Initialize virtual TPM command buffers process 700, in various embodiments, may be executed at least in part by early system or start-up software, such as, for example, BIOS 528, in conjunction with TPM hardware and firmware as will be described hereinafter, upon a start-up or reset/reboot of an electronic device, such as electronic device 500. In embodiments, the method 700 may be embodied as machine-readable and executable instructions. Initialize virtual TPM buffers process 700 includes allocate system memory at block 702, TPM DMA initialization at block 704, read base address of virtual TPM buffer at block 706, initialize virtual machine(s) at block 708, check for another virtual machine to initialize at block 710, virtual machine exit check at block 712, and evaluate exit condition block 714.

Allocate system memory block 702 includes the early system or start-up software, such as BIOS 528, allocating a block or blocks of system memory sufficient to support a given number of virtual machines. The system memory allocated is, in embodiments, dynamic random access memory (DRAM), such as memory 504. The number of virtual machines may, in embodiments, be dependent at least in part upon the maximum number of virtual machines that a given TPM may be capable of supporting. TPM DMA initialization block 704 includes initializing the TPM hardware DMA engine, such as DMA engine 602, with the base address and size of the block of memory to be utilized for the virtual TPM buffers. In embodiments, initialization block 704 may include the early system or start-up software, such as BIOS 528, issuing one or more command signals to the TPM hardware DMA engine that includes the base address and size parameters of the block or blocks of memory to be allocated for use as the virtual TPM buffers. Typically, and in embodiments, each virtual machine supports a virtual TPM buffer of 4 KB in size. Further, in embodiments, initialization block 704 may also include initializing the TPM firmware, such as TPM firmware 604, with a base address for each of the respective virtual TPM buffers and the addresses that are assigned as the virtual control registers 650, 652, 656 of the virtual TPMs.

At block 706, the virtual machine manager (VMM) reads the base address and size of each virtual TPM buffer. The virtual machines are then initialized at block 708. Initializing the virtual machines at block 708, in embodiments, may include the VMM creating a TPM 2.0 ACPI table, as will be known to those of ordinary skill in the art, in the memory of each virtual machine into which ACPI table the VMM writes or otherwise stores the address of the virtual TPM buffer corresponding to each virtual TPM. At block 710, a check is performed to determine whether any additional virtual machines are to be initialized. If so, the process of initializing VMs at block 708 is repeated. If not, at block 712 the process 700 monitors each of the virtual TPM buffers for a VM exit event. In embodiments, the control registers 650-656 of each virtual TPM buffer are monitored to determine when a predetermined bit of any of the virtual TPM control registers, such as the bit corresponding to the hash start bit or the $TPM_0$ bit, is set. At block 714, the VMM evaluates the content of the relevant virtual TPM control register, such as the virtual TPM control register with the $TPM_0$ bit set, and determines an appropriate action based at least in part upon the VM exit condition or content of the relevant VTPM control register, such as, in embodiments, whether to call the TPM hardware to thereby alert the TPM hardware that a command is present for processing in the relevant virtual TPM buffer or to take some other action.

Figure 8:
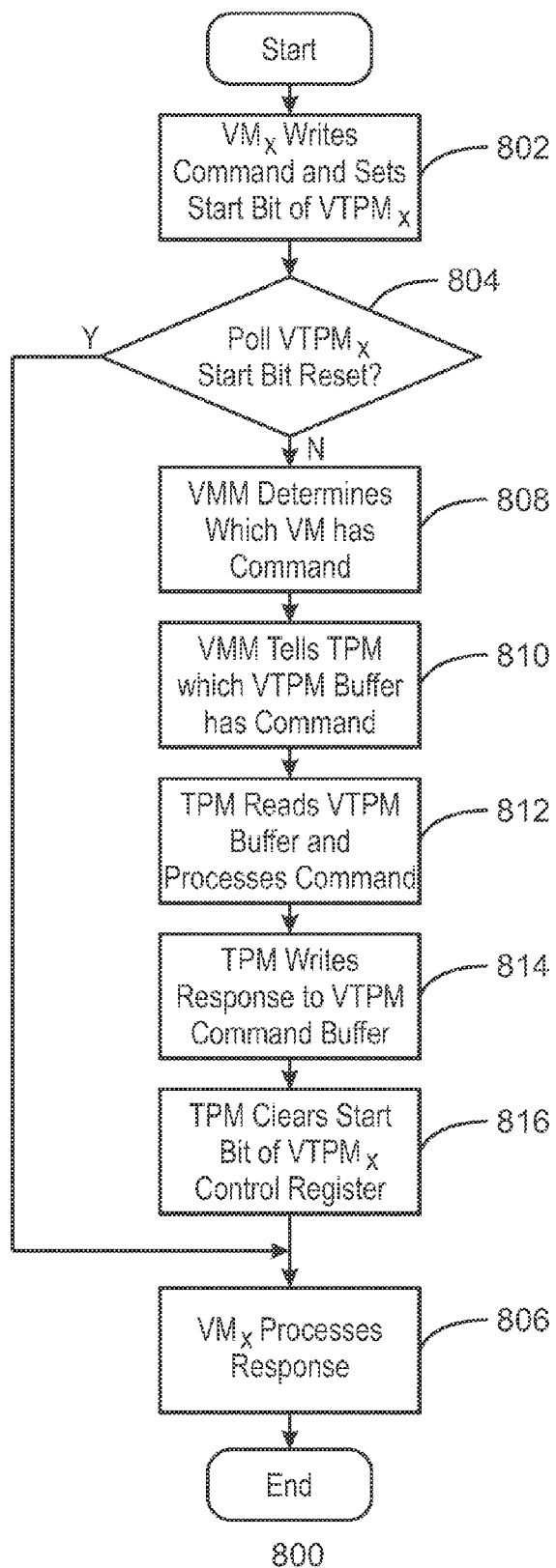
FIG. 8 is a process flow diagram of one embodiment of a method for issuing commands to a virtual TPM.

FIG. 8 is a process flow diagram illustrating a method for issuing commands to a virtual TPM. Issue command to virtual TPM process 800 includes at block 802 an unknown one of the VMs, designated as VMx, writing a command to an address within the block of memory assigned to the corresponding VTPM command buffer, designated as the VTPMx command buffer, and setting within the address location serving as the VTPMx control register, such as the VTPM control registers 650-656, a bit that corresponds to the hash start or $TPM_0$ bit of VTPMx. At block 804, the corresponding VMx polls the bit of the VTPMx control register that corresponds to the hash start or $TPM_0$ bit to detect whether that bit has been reset. A reset of the bit of the VTPMx control register corresponding to the hash start or $TPM_0$ bit indicates that the command that was written into the VTPMx command buffer has been completed, and at block 806 the VMx processes the response issued by TPM 508 to that command. If the bit of the VTPMx control register that corresponds to the hash start or $TPM_0$ bit has not been reset, the process 800 proceeds to block 808.

At block 808, the VMM, such as VMM 530, determines the identity of VMx, i.e., the VMM determines which of the VTPM command buffers stores the command to be processed. More particularly, setting of the bit of the VTPMx control register that corresponds to the hash start or $TPM_0$ bit may cause a VM exit, as described above in regard to FIG. 7. The VMM, such as VMM 530, detects the VM exit condition and, in embodiments, traps the VM exit to thereby determine which of the VMs, and thus which corresponding VTPM command buffer, generated the VM exit condition. Thus, the VMM 530 is able to identify which of VM-0 630, VM-1 632, . . . and VM-3 636 generated the VM exit condition.

At block 810, the VMM tells the TPM, such as TPM 508, which VM, and thus which VTPM command buffer, has a command that needs to be processed. In embodiments, the VMM 530 writes to the start field of TPM 508 a value corresponding to the VTPM command buffer of VMx. The TPM may then, in embodiments, be interrupted and determine from the start field which of the VMs has a command to be processed.

At block 812, the TPM reads the contents of the relevant VTPM command buffer and processes the command. More particularly, the TPM firmware may issue a direct memory access read of the relevant VTPM command buffer and process the command. At block 814, the TPM writes the command response to the relevant VTPM command buffer. More particularly, the TPM firmware may issue a direct memory access write of the response to the relevant VTPM command buffer. At block 816, the TPM clears the start bit of the relevant VTPM control register. In embodiments, the TPM may issue a direct memory access write to clear the relevant VTPM control register.

Figure 9:
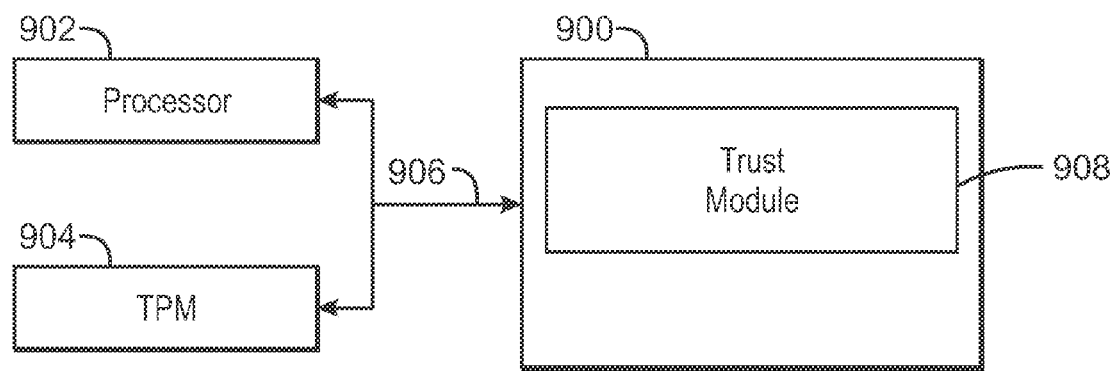
FIG. 9 is a block diagram depicting an example of a tangible, non-transitory computer-readable medium that can grant access to a trusted platform module command buffer prior to initialization of the trusted platform module.

FIG. 9 is a block diagram depicting an example of a tangible, non-transitory computer-readable medium that can grant access to a trusted platform module command buffer prior to initialization of the trusted platform module. The tangible, non-transitory, computer-readable medium 900 may be accessed by a processor 902 and/or a TPM 904 over a computer interconnect 906. Furthermore, the tangible, non-transitory, computer-readable medium 900 may include code to direct the processor 902 and/or the TPM 904 to perform the operations of the techniques described above.

The various software components discussed herein may be stored on the tangible, non-transitory, computer-readable medium 900, as indicated in FIG. 9. For example, a trust module 908 may be adapted to direct the TPM 904 to determine whether to automatically grant processor 902 access to a TPM command buffer prior to TPM firmware being loaded and the TPM 904 being initialized. It is to be understood that any number of additional software components not shown in FIG. 9 may be included within the tangible, non-transitory, computer-readable medium 900, depending on the specific application.

EXAMPLE 1

An electronic device is provided that includes a central processing unit, non-volatile memory accessible by the central processing unit, and system start-up computer readable instructions stored in the non-volatile memory. A trusted platform module having a control register, firmware, a command buffer, and a control register includes logic that grants the central processing unit access to the control register and command buffer before the trusted platform module is fully initialized. The central processing unit may then store a measurement of the early system start up software and store that measurement in the trusted platform module, thereby enabling the measurement of the early system start up software to serve as the core root of trust for measurement.

In some embodiments, the trusted platform module logic grants the central processing unit access to the command buffer and control register prior to the firmware of the trusted platform module being loaded. In some examples, the trusted platform module logic is hardware logic that comprises a multiplexor. The trusted platform logic can also include logic granting the central processing unit access to the locality four register of the trusted platform module. In some embodiments, the central processing unit takes a measurement of at least a portion of the early system start up computer readable instructions, and stores a representation of that measurement in the trusted platform module prior to the trusted platform module being fully initialized. In some examples, the representation of the measurement comprises a hash of the measurement, and the central processing unit stores the cryptographic hash in the trusted platform module prior to the firmware of the trusted platform module being completely loaded and initialized.

In some embodiments, the early system start up computer readable instructions comprise the basic input output system of the electronic device, and thus the measurement of the basic input output system comprises the core root of trust for measurement. In some embodiments, the central processing unit accesses the trusted platform module using a memory mapped input/output address accessible to only the central processing unit.

EXAMPLE 2

An electronic device is also provided herein. The electronic device includes logic to take a measurement of at least a portion of the early system start up computer readable instructions of the device upon a reboot or start-up of the device. The electronic device can also include logic to store a representation of the measurement in a trusted platform module of the electronic device prior to initialization of the firmware of the trusted platform module. Additionally, the electronic device can include logic to grant access to the representation of the measurement stored in the trusted platform module prior to initialization of the trusted platform module thereby enabling the representation of the measurement to be utilized as the core root of trust for measurement.

In some embodiments, logic to store a representation comprises granting access to a register of the trusted platform module prior to the firmware of the trusted platform module being fully loaded and initialized. In some examples, the register of the trusted platform module is memory mapped to a predetermined piece of hardware of the electronic device, and the granting access further comprises hardware logic of the trusted platform module enabling access to the register. The predetermined piece of hardware of the electronic device may include a central processing unit of the device. In some embodiments, the logic to store a representation further comprises setting a predetermined bit of the trusted platform module control register.

Additionally, in some examples, the electronic device can include logic to determine whether a previous request for access to the trusted platform module is currently pending or was previously granted, and, if so, ignoring the request from the predetermined piece of hardware, and granting the request if no other request is currently pending or was previously granted. In some embodiments, the electronic device also includes logic to check the status of a predetermined bit of the trusted platform control register. In some examples, the predetermined bit is the hash start bit, and the determining further comprises determining whether only the hash start bit of the trusted platform control register is set. In some embodiments, the electronic device also includes logic to grant the predetermined piece of hardware access to the command buffer of the trusted platform module. In some examples, logic to store a representation comprises cryptographically hashing the measurement, and storing the cryptographic hash in the trusted platform module.

EXAMPLE 3

A method for initializing virtual trusted platform module buffers in an electronic device is also described herein. The method can include allocating a block dynamic random access memory of the electronic device for a plurality of virtual trusted platform module buffers, the number of virtual machine trusted platform module buffers being dependent at least in part upon the number of virtual machines a trusted platform module of the electronic device can support. Additionally, the method may include initializing the trusted platform module with a base address and size of the memory block allocated to the virtual trusted platform module buffers. Furthermore, the method may include initializing a virtual machine manager of the electronic device with the base address and size of each virtual trusted platform module buffer within the allocated block of memory, and initializing the virtual machines.

In some embodiments, initializing the virtual machines comprises creating a TPM 2.0 ACPI table in the memory of each virtual machine that contains the address of the virtual trusted platform module buffer corresponding to each virtual trusted platform module. In some examples, the method also includes setting a virtual machine exit point for each of the virtual machines, wherein each of the virtual trusted platform module buffers includes a control register, and the virtual machine exit point comprises a predetermined bit pattern stored in the control register. In some embodiments, the machine exit point bit pattern comprises setting a start bit of the control register of a virtual trusted platform module buffer. Additionally, in some examples, the method includes issuing a command from a virtual trusted platform module buffer to the trusted platform module.

In some embodiments, issuing a command from a virtual trusted platform module buffer to the trusted platform module comprises a virtual machine writing the command to the virtual trusted platform module buffer, and writing the virtual machine exit point bit pattern to the virtual machine control register. The virtual machine manager may determine which virtual machine has a command to be processed, and write the address of that virtual machine into the trusted platform module control register; the trusted platform module reading the command from the virtual trusted platform module buffer, processing the command, and writing a command response to the virtual trusted platform module buffer; clearing the virtual machine exit point from the virtual machine control register; and the virtual machine processing the command response. Furthermore, in some embodiments, the trusted platform module utilizes direct memory access to read from and write to the virtual trusted platform module buffers.

EXAMPLE 4

A non-transitory, computer-readable medium comprising a plurality of instructions is also described herein. In response to being executed on a computing device, the plurality of instructions can cause the computing device to take a measurement of at least a portion of early system start up computer readable instructions of the electronic device upon a reboot or start-up of the device and store a representation of the measurement in a trusted platform module of the electronic device prior to initialization of the trusted platform module. The plurality of instructions may also cause the computing device to grant access to the representation of the measurement stored in the trusted platform module prior to initialization of the trusted platform module to thereby enable the representation of the measurement to be utilized as the core root of trust for measurement. In some embodiments, the plurality of instructions can cause the computing device to grant access to a register of the trusted platform module prior to the firmware of the trusted platform module being fully loaded and initialized.

It is to be understood that specifics in the aforementioned examples may be used anywhere in one or more embodiments. For instance, all optional features of exemplary devices described above may also be implemented with respect to any of the other exemplary devices and/or the method described herein. Furthermore, although flow diagrams and/or state diagrams may have been used herein to describe embodiments, the present techniques are not limited to those diagrams or to their corresponding descriptions. For example, the illustrated flow need not move through each box or state or in exactly the same order as depicted and described.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An electronic device, comprising:
a central processing unit, non-volatile memory accessible by the central processing unit, and early system start-up computer readable instructions stored in the non-volatile memory; and
a trusted platform module having a control register, firmware, and a command buffer, communicatively coupled to the central processing unit, the trusted platform module further comprises logic that grants the central processing unit access to the control register and the command buffer before the trusted platform module is fully initialized, the logic to grant the central processing unit access to accept, decode, and store a measurement in the command buffer in response to detecting that a hash start bit of the control register is set, and that the hash start bit is an only bit of the control register that is set.

2. The electronic device of claim 1, wherein the trusted platform module logic grants the central processing unit access to the command buffer and control register prior to the firmware of the trusted platform module being loaded.

3. The electronic device of claim 1, wherein the trusted platform module logic is hardware logic.

4. The electronic device of claim 3, wherein the hardware logic comprises a multiplexor.

5. The electronic device of claim 2, wherein the trusted platform logic comprises logic granting the central processing unit access to a locality four register of the trusted platform module.

6. The electronic device of claim 1, wherein the central processing unit takes the measurement of at least a portion of the early system start up computer readable instructions, and stores a representation of the measurement in the trusted platform module prior to the trusted platform module being fully initialized.

7. The electronic device of claim 6, wherein the representation of the measurement comprises a hash of the measurement, and the central processing unit stores the hash of the measurement in the trusted platform module prior to the firmware of the trusted platform module being completely loaded and initialized.

8. The electronic device of claim 6, wherein the early system start up computer readable instructions comprise a basic input output system of the electronic device, and a measurement of the basic input output system comprises a core root of trust for measurement.

9. The electronic device of claim 1, wherein the central processing unit accesses the trusted platform module using a memory mapped input/output address accessible to only the central processing unit.

10. An electronic device, comprising
logic to take a measurement of at least a portion of early system start up computer readable instructions of the electronic device upon a reboot or start-up of the device;
logic to store a representation of the measurement in a trusted platform module of the electronic device prior to initialization of the trusted platform module;
logic to grant access to the representation of the measurement stored in the trusted platform module prior to initialization of the trusted platform module to enable the representation of the measurement to be utilized as a core root of trust for measurement, the logic to grant a central processing unit access to accept, decode, and store the measurement in a command buffer in response to detecting that a hash start bit of a control register is set, and that the hash start bit is an only bit of the control register that is set; and logic to grant access to the control register and the command buffer before the trusted platform module is fully initialized.

11. The electronic device of claim 10, wherein the control register is memory mapped to a predetermined piece of hardware of the electronic device, and the granting access further comprises hardware logic of the trusted platform module enabling access to the control register.

12. The electronic device of claim 11, wherein the predetermined piece of hardware of the electronic device comprises the central processing unit of the device.

13. The electronic device of claim 11, wherein the logic to grant access further comprises determining whether a previous request for access to the trusted platform module is currently pending or was previously granted, and, if so, ignoring a request from the predetermined piece of hardware, and granting the request if no other request is currently pending or was previously granted.

14. The electronic device of claim 13, comprising logic to check a status of a predetermined bit of the control register.

15. The electronic device of claim 13, wherein the control register comprises a locality four register of the trusted platform module.

16. The electronic device of claim 13, comprising determining whether only the hash start bit of the control register is set.

17. The electronic device of claim 10, wherein the logic to store the representation of the measurement comprises cryptographically hashing the measurement, and storing the cryptographic hash in the trusted platform module.

18. A non-transitory, computer-readable medium comprising a plurality of instructions that, in response to being executed on a computing device, cause the computing device to:

take a measurement of at least a portion of early system start up computer readable instructions of the electronic device upon a reboot or start-up of the device; and store a representation of the measurement in a control buffer of a trusted platform module of the electronic device prior to initialization of the trusted platform module, wherein the measurement is decoded prior to storing the representation of the measurement and the representation of the measurement is stored in response to detecting that a hash start bit of a control register is set, and that the hash start bit is an only bit of the control register that is set;

grant access to the representation of the measurement stored in the trusted platform module prior to initialization of the trusted platform module to thereby enable the representation of the measurement to be utilized as a core root of trust for the measurement; and grant access to the control register and the control buffer before the trusted platform module is fully initialized.

* * * * *